(12) United States Patent
Bertness

(10) Patent No.: US 6,888,468 B2
(45) Date of Patent: May 3, 2005

(54) APPARATUS AND METHOD FOR PROTECTING A BATTERY FROM OVERDISCHARGE

(75) Inventor: Kevin I. Bertness, Batavia, IL (US)

(73) Assignee: Midtronics, Inc., Willowbrook, IL (US)

( * ) Notice: Subject to any disclaimer, the term of this patent is extended or adjusted under 35 U.S.C. 154(b) by 6 days.

(21) Appl. No.: 10/349,053

(22) Filed: Jan. 22, 2003

(65) Prior Publication Data

US 2004/0140904 A1 Jul. 22, 2004

(51) Int. Cl.[7] ............................ G21B 21/00; H02J 7/00; H02H 5/04
(52) U.S. Cl. ............................... 340/636.15; 340/636.1; 340/636.12; 320/132; 320/134; 320/136; 361/23
(58) Field of Search ........................ 340/636.1, 636.12, 340/636.15, 636.13; 320/132, 134, 136, 127, 43, 48, 13, 133; 361/23–32; 324/134, 426, 430

(56) References Cited

U.S. PATENT DOCUMENTS

| 2,514,745 | A | 7/1950 | Dalzell | 171/95 |
| 3,356,936 | A | 12/1967 | Smith | 324/29.5 |
| 3,562,634 | A | 2/1971 | Latner | 31/4 |
| 3,989,544 | A | 11/1976 | Santo | 429/65 |

(Continued)

FOREIGN PATENT DOCUMENTS

| DE | 29 26 716 B1 | 1/1981 |
| EP | 0 022 450 A1 | 1/1981 |
| EP | 0 637 754 A1 | 2/1995 |
| EP | 0 772 056 A1 | 5/1997 |

(Continued)

OTHER PUBLICATIONS

"Electrochemical Impedance Spectroscopy in Battery Development and Testing", *Batteries International*, Apr. 1997, pp. 59 and 62–63.
"Battery Impedance", by E. Willihnganz et al., *Electrical Engineering*, Sep. 1959, pp. 922–925.
"Determining The End of Battery Life", by S. DeBardelaben, *IEEE*, 1986, pp. 365–368.
"A Look at the Impedance of a Cell", by S. Debardelaben, *IEEE*, 1988, pp. 394–397.
"The Impedance of Electrical Storage Cells", by N.A. Hampson et al., *Journal of Applied Electrochemistry*, 1980, pp. 3–11.
"A Package for Impedance/Admittance Data Analysis", by B. Boukamp, *Solid State Ionics*, 1986, pp. 136–140.
"Precision of Impedance Spectroscopy Estimates of Bulk, Reaction Rate, and Diffusion Parameters", by J. Macdonald et al., *J. Electroanal, Chem.*, 1991, pp. 1–11.

(Continued)

*Primary Examiner*—Jeffery Hofsass
*Assistant Examiner*—Lam Pham
(74) *Attorney, Agent, or Firm*—Westman, Champlin & Kelly

(57) ABSTRACT

A battery discharge indicator for protecting a storage battery is provided. The battery discharge indicator includes a positive connector that can couple to a positive terminal of the battery and a negative connector that can couple to a negative terminal of the battery. Also included, is a voltage sensor that couples to the battery via the positive connector and the negative connector and senses a battery terminal voltage. A microprocessor, coupled to the voltage sensor, provides a first alarm signal if a magnitude of the battery terminal voltage is below a first threshold for a first interval of time and if the magnitude of the battery terminal voltage is below a second threshold for a second interval of time.

20 Claims, 4 Drawing Sheets

U.S. PATENT DOCUMENTS

| | | | |
|---|---|---|---|
| 3,593,099 A | 7/1971 | Scholl | 320/13 |
| 3,607,673 A | 9/1971 | Seyl | 204/1 |
| 3,676,770 A | 7/1972 | Sharaf et al. | 324/29.5 |
| 3,729,989 A | 5/1973 | Little | 73/133 |
| 3,753,094 A | 8/1973 | Furuishi et al. | 324/29.5 |
| 3,808,522 A | 4/1974 | Sharaf | 324/29.5 |
| 3,811,089 A | 5/1974 | Strezelewicz | 324/170 |
| 3,873,911 A | 3/1975 | Champlin | 324/29.5 |
| 3,876,931 A | 4/1975 | Godshalk | 324/28 |
| 3,886,443 A | 5/1975 | Miyakawa et al. | 324/29.5 |
| 3,889,248 A | 6/1975 | Ritter | 340/249 |
| 3,906,329 A | 9/1975 | Bader | 320/44 |
| 3,909,708 A | 9/1975 | Champlin | 324/29.5 |
| 3,936,744 A | 2/1976 | Perlmutter | 324/158 |
| 3,946,299 A | 3/1976 | Christianson et al. | 320/43 |
| 3,947,757 A | 3/1976 | Grube et al. | 324/28 |
| 3,969,667 A | 7/1976 | McWilliams | 324/29.5 |
| 3,979,657 A * | 9/1976 | Yorksie | 320/136 |
| 3,979,664 A | 9/1976 | Harris | 324/17 |
| 3,984,762 A | 10/1976 | Dowgiallo, Jr. | 324/29.5 |
| 3,984,768 A | 10/1976 | Staples | 324/62 |
| 4,008,619 A | 2/1977 | Alcaide et al. | 73/398 |
| 4,024,953 A | 5/1977 | Nailor, III | 206/344 |
| 4,047,091 A | 9/1977 | Hutchines et al. | 363/59 |
| 4,053,824 A | 10/1977 | Dupuis et al. | 324/29.5 |
| 4,070,624 A | 1/1978 | Taylor | 327/158 |
| 4,086,531 A | 4/1978 | Bernier | 324/158 |
| 4,112,351 A | 9/1978 | Back et al. | 324/16 |
| 4,114,083 A | 9/1978 | Benham et al. | 320/39 |
| 4,126,874 A | 11/1978 | Suzuki et al. | 354/60 |
| 4,178,546 A | 12/1979 | Hulls et al. | 324/158 |
| 4,193,025 A | 3/1980 | Frailing et al. | 324/427 |
| 4,207,611 A | 6/1980 | Gordon | 364/580 |
| 4,217,645 A | 8/1980 | Barry et al. | 364/483 |
| 4,297,639 A | 10/1981 | Branham | 324/429 |
| 4,315,204 A | 2/1982 | Sievers et al. | 322/28 |
| 4,316,185 A | 2/1982 | Watrous et al. | 340/636 |
| 4,322,685 A | 3/1982 | Frailing et al. | 324/429 |
| 4,351,405 A | 9/1982 | Fields et al. | 180/65 |
| 4,361,809 A | 11/1982 | Bil et al. | 324/426 |
| 4,363,407 A | 12/1982 | Buckler et al. | 209/3.3 |
| 4,369,407 A | 1/1983 | Korbell | 324/416 |
| 4,379,989 A | 4/1983 | Kurz et al. | 320/26 |
| 4,379,990 A | 4/1983 | Sievers et al. | 322/99 |
| 4,385,269 A | 5/1983 | Aspinwall et al. | 320/14 |
| 4,390,828 A | 6/1983 | Converse et al. | 320/32 |
| 4,392,101 A | 7/1983 | Saar et al. | 320/20 |
| 4,396,880 A | 8/1983 | Windebank | 320/21 |
| 4,408,157 A | 10/1983 | Beaubien | 324/62 |
| 4,412,169 A | 10/1983 | Dell'Orto | 320/64 |
| 4,423,378 A | 12/1983 | Marino et al. | 324/427 |
| 4,423,379 A | 12/1983 | Jacobs et al. | 324/429 |
| 4,424,491 A | 1/1984 | Bobbett et al. | 324/433 |
| 4,459,548 A | 7/1984 | Lentz et al. | 324/158 |
| 4,514,694 A | 4/1985 | Finger | 324/429 |
| 4,520,353 A | 5/1985 | McAuliffe | 340/636 |
| 4,564,798 A | 1/1986 | Young | 320/6 |
| 4,633,418 A | 12/1986 | Bishop | 364/554 |
| 4,659,977 A | 4/1987 | Kissel et al. | 320/64 |
| 4,660,027 A * | 4/1987 | Davis | 340/636.15 |
| 4,663,580 A | 5/1987 | Wortman | 320/35 |
| 4,665,370 A | 5/1987 | Holland | 324/429 |
| 4,667,143 A | 5/1987 | Cooper et al. | 320/22 |
| 4,667,279 A | 5/1987 | Maier | 363/46 |
| 4,678,998 A | 7/1987 | Muramatsu | 324/427 |
| 4,679,000 A | 7/1987 | Clark | 324/428 |
| 4,680,528 A | 7/1987 | Mikami et al. | 320/32 |
| 4,686,442 A | 8/1987 | Radomski | 320/17 |
| 4,697,134 A | 9/1987 | Burkum et al. | 320/48 |
| 4,707,795 A | 11/1987 | Alber et al. | 364/550 |
| 4,709,202 A | 11/1987 | Koenck et al. | 320/43 |
| 4,710,861 A | 12/1987 | Kanner | 363/46 |
| 4,719,428 A | 1/1988 | Liebermann | 324/436 |
| 4,743,855 A | 5/1988 | Randin et al. | 324/430 |
| 4,745,349 A | 5/1988 | Palanisamy et al. | 320/22 |
| 4,816,768 A | 3/1989 | Champlin | 324/428 |
| 4,820,966 A | 4/1989 | Fridman | 320/32 |
| 4,825,170 A | 4/1989 | Champlin | 324/436 |
| 4,847,547 A | 7/1989 | Eng, Jr. et al. | 320/35 |
| 4,849,700 A | 7/1989 | Morioka et al. | 324/427 |
| 4,876,495 A | 10/1989 | Palanisamy et al. | 320/18 |
| 4,881,038 A | 11/1989 | Champlin | 324/426 |
| 4,888,716 A | 12/1989 | Ueno | 364/550 |
| 4,912,416 A | 3/1990 | Champlin | 324/430 |
| 4,913,116 A | 4/1990 | Katogi et al. | 123/425 |
| 4,929,931 A | 5/1990 | McCuen | 340/636 |
| 4,931,738 A | 6/1990 | MacIntyre et al. | 324/435 |
| 4,937,528 A | 6/1990 | Palanisamy | 324/430 |
| 4,947,124 A | 8/1990 | Hauser | 324/430 |
| 4,956,597 A | 9/1990 | Heavey et al. | 320/14 |
| 4,968,941 A | 11/1990 | Rogers | 324/428 |
| 4,968,942 A | 11/1990 | Palanisamy | 324/430 |
| 5,004,979 A | 4/1991 | Marino et al. | 324/160 |
| 5,032,825 A | 7/1991 | Xuznicki | 340/636 |
| 5,037,778 A | 8/1991 | Stark et al. | 437/216 |
| 5,047,722 A | 9/1991 | Wurst et al. | 324/430 |
| 5,087,881 A | 2/1992 | Peacock | 324/378 |
| 5,095,223 A | 3/1992 | Thomas | 307/110 |
| 5,126,675 A | 6/1992 | Yang | 324/435 |
| 5,140,269 A | 8/1992 | Champlin | 324/433 |
| 5,144,218 A | 9/1992 | Bosscha | 320/44 |
| 5,144,248 A | 9/1992 | Alexandres et al. | 324/428 |
| 5,160,881 A | 11/1992 | Schramm et al. | 322/7 |
| 5,170,124 A | 12/1992 | Blair et al. | 324/434 |
| 5,179,335 A | 1/1993 | Nor | 320/21 |
| 5,194,799 A | 3/1993 | Tomantschger | 320/2 |
| 5,204,611 A | 4/1993 | Nor et al. | 320/21 |
| 5,214,370 A | 5/1993 | Harm et al. | 320/35 |
| 5,214,385 A | 5/1993 | Gabriel et al. | 324/434 |
| 5,241,275 A | 8/1993 | Fang | 324/430 |
| 5,254,952 A | 10/1993 | Salley et al. | 324/429 |
| 5,266,880 A | 11/1993 | Newland | 320/14 |
| 5,281,919 A | 1/1994 | Palanisamy | 324/427 |
| 5,281,920 A | 1/1994 | Wurst | 324/430 |
| 5,295,078 A | 3/1994 | Stich et al. | 364/483 |
| 5,298,797 A | 3/1994 | Redl | 307/246 |
| 5,300,874 A | 4/1994 | Shimamoto et al. | 320/15 |
| 5,302,902 A | 4/1994 | Groehl | 324/434 |
| 5,315,287 A | 5/1994 | Sol | 340/455 |
| 5,321,626 A | 6/1994 | Palladino | 364/483 |
| 5,331,268 A | 7/1994 | Patino et al. | 320/20 |
| 5,332,958 A * | 7/1994 | Sloan | 320/136 |
| 5,336,993 A | 8/1994 | Thomas et al. | 324/158.1 |
| 5,338,515 A | 8/1994 | Dalla Betta et al. | 422/95 |
| 5,339,018 A | 8/1994 | Brokaw | 320/35 |
| 5,343,137 A * | 8/1994 | Kitaoka et al. | 320/132 |
| 5,343,380 A | 8/1994 | Champlin | 363/46 |
| 5,347,163 A | 9/1994 | Yoshimura | 307/66 |
| 5,352,968 A | 10/1994 | Reni et al. | 320/35 |
| 5,365,160 A | 11/1994 | Leppo et al. | 320/22 |
| 5,365,453 A | 11/1994 | Startup et al. | 364/481 |
| 5,381,096 A | 1/1995 | Hirzel | 324/427 |
| 5,412,323 A | 5/1995 | Kato et al. | 324/429 |
| 5,416,402 A * | 5/1995 | Reher et al. | 340/636.15 |
| 5,426,371 A | 6/1995 | Salley et al. | 324/429 |
| 5,426,416 A | 6/1995 | Jefferies et al. | 340/664 |
| 5,432,426 A | 7/1995 | Yoshida | 320/20 |
| 5,434,495 A | 7/1995 | Toko | 320/44 |
| 5,435,185 A | 7/1995 | Eagan | 73/587 |
| 5,442,274 A | 8/1995 | Tamai | 320/23 |
| 5,445,026 A | 8/1995 | Eagan | 73/591 |

| Patent Number | Date | Inventor | Class |
|---|---|---|---|
| 5,449,996 A | 9/1995 | Matsumoto et al. | 320/20 |
| 5,449,997 A | 9/1995 | Gilmore et al. | 320/39 |
| 5,451,881 A | 9/1995 | Finger | 324/433 |
| 5,457,377 A | 10/1995 | Jonsson | 320/5 |
| 5,469,043 A | 11/1995 | Cherng et al. | 320/31 |
| 5,479,084 A * | 12/1995 | Satsuma et al. | 320/136 |
| 5,485,090 A | 1/1996 | Stephens | 324/433 |
| 5,488,300 A | 1/1996 | Jamieson | 324/432 |
| 5,519,383 A | 5/1996 | De La Rosa | 340/636 |
| 5,528,148 A | 6/1996 | Rogers | 324/426 |
| 5,534,771 A * | 7/1996 | Massie | 323/285 |
| 5,537,967 A | 7/1996 | Tashiro et al. | 123/792.1 |
| 5,546,317 A | 8/1996 | Andrieu | 364/481 |
| 5,548,273 A | 8/1996 | Nicol et al. | 340/439 |
| 5,550,485 A | 8/1996 | Falk | 324/772 |
| 5,561,380 A | 10/1996 | Sway-Tin et al. | 324/509 |
| 5,562,501 A | 10/1996 | Kinoshita et al. | 439/852 |
| 5,563,496 A | 10/1996 | McClure | 320/48 |
| 5,572,136 A | 11/1996 | Champlin | 324/426 |
| 5,574,355 A | 11/1996 | McShane et al. | 320/39 |
| 5,583,416 A | 12/1996 | Klang | 320/22 |
| 5,585,728 A | 12/1996 | Champlin | 324/427 |
| 5,589,757 A | 12/1996 | Klang | 320/22 |
| 5,592,093 A | 1/1997 | Klingbiel | 324/426 |
| 5,596,260 A | 1/1997 | Moravec et al. | 320/30 |
| 5,598,098 A | 1/1997 | Champlin | 324/430 |
| 5,602,462 A | 2/1997 | Stich et al. | 323/258 |
| 5,606,242 A | 2/1997 | Hull et al. | 320/48 |
| 5,621,298 A | 4/1997 | Harvey | 320/5 |
| 5,623,197 A * | 4/1997 | Roseman et al. | 320/134 |
| 5,633,985 A | 5/1997 | Severson et al. | 395/2.76 |
| 5,637,978 A | 6/1997 | Kellett et al. | 320/2 |
| 5,642,031 A | 6/1997 | Brotto | 320/21 |
| 5,650,937 A | 7/1997 | Bounaga | 364/483 |
| 5,652,501 A | 7/1997 | McClure et al. | 320/17 |
| 5,653,659 A | 8/1997 | Kunibe et al. | 477/111 |
| 5,656,920 A | 8/1997 | Cherng et al. | 320/31 |
| 5,675,234 A | 10/1997 | Greene | 320/15 |
| 5,677,077 A | 10/1997 | Faulk | 429/90 |
| 5,699,050 A | 12/1997 | Kanazawa | 340/636 |
| 5,701,089 A | 12/1997 | Perkins | 327/772 |
| 5,705,929 A | 1/1998 | Caravello et al. | 324/430 |
| 5,710,503 A | 1/1998 | Sideris et al. | 320/6 |
| 5,711,648 A | 1/1998 | Hammerslag | 414/786 |
| 5,717,336 A | 2/1998 | Basell et al. | 324/430 |
| 5,717,937 A | 2/1998 | Fritz | 395/750.01 |
| 5,739,667 A | 4/1998 | Matsuda et al. | 320/5 |
| 5,741,307 A * | 4/1998 | Kroll | 607/5 |
| 5,747,909 A | 5/1998 | Syverson et al. | 310/156 |
| 5,754,417 A | 5/1998 | Nicollini | 363/60 |
| 5,757,192 A | 5/1998 | McShane et al. | 324/427 |
| 5,760,587 A | 6/1998 | Harvey | 324/434 |
| 5,773,978 A | 6/1998 | Becker | 324/430 |
| 5,789,899 A | 8/1998 | van Phuoc et al. | 320/30 |
| 5,793,359 A | 8/1998 | Ushikubo | 345/169 |
| 5,796,239 A | 8/1998 | van Phuoc et al. | 320/107 |
| 5,808,469 A | 9/1998 | Kopera | 324/43.4 |
| 5,818,234 A | 10/1998 | McKinnon | 324/433 |
| 5,821,756 A | 10/1998 | McShane et al. | 324/430 |
| 5,821,757 A | 10/1998 | Alvarez et al. | 324/434 |
| 5,825,174 A | 10/1998 | Parker | 324/106 |
| 5,831,435 A | 11/1998 | Troy | 324/426 |
| 5,862,515 A | 1/1999 | Kobayashi et al. | 702/63 |
| 5,872,443 A | 2/1999 | Williamson | 320/21 |
| 5,895,440 A | 4/1999 | Proctor et al. | 702/63 |
| 5,914,605 A | 6/1999 | Bertness | 324/430 |
| 5,927,938 A | 7/1999 | Hammerslag | 414/809 |
| 5,929,609 A | 7/1999 | Joy et al. | 322/25 |
| 5,939,855 A | 8/1999 | Proctor et al. | 320/104 |
| 5,939,861 A | 8/1999 | Joko et al. | |
| 5,945,829 A | 8/1999 | Bertness | 324/430 |
| 5,951,229 A | 9/1999 | Hammerslag | 414/398 |
| 5,961,561 A | 10/1999 | Wakefield, II | 701/29 |
| 5,961,604 A | 10/1999 | Anderson et al. | 709/229 |
| 5,969,625 A | 10/1999 | Russo | 340/636 |
| 6,002,238 A | 12/1999 | Champlin | 320/134 |
| 6,008,652 A | 12/1999 | Theofanopoulos et al. | 324/434 |
| 6,009,369 A | 12/1999 | Boisvert et al. | 701/99 |
| 6,031,354 A | 2/2000 | Wiley et al. | 320/116 |
| 6,037,751 A | 3/2000 | Klang | 320/160 |
| 6,037,777 A | 3/2000 | Champlin | 324/430 |
| 6,051,976 A | 4/2000 | Bertness | 324/426 |
| 6,061,638 A | 5/2000 | Joyce | 702/63 |
| 6,072,299 A | 6/2000 | Kurie et al. | 320/112 |
| 6,072,300 A | 6/2000 | Tsuji | 320/116 |
| 6,081,098 A | 6/2000 | Bertness et al. | 320/134 |
| 6,091,245 A | 7/2000 | Bertness | 324/426 |
| 6,094,033 A | 7/2000 | Ding et al. | 320/132 |
| 6,104,167 A | 8/2000 | Bertness et al. | 320/132 |
| 6,111,731 A * | 8/2000 | Cepynsky et al. | 361/23 |
| 6,114,834 A | 9/2000 | Parise | 320/109 |
| 6,137,269 A | 10/2000 | Champlin | 320/150 |
| 6,140,797 A | 10/2000 | Dunn | 320/105 |
| 6,144,185 A | 11/2000 | Dougherty et al. | 320/132 |
| 6,150,793 A | 11/2000 | Lesesky et al. | 320/104 |
| 6,161,640 A | 12/2000 | Yamaguchi | 180/65.8 |
| 6,163,156 A | 12/2000 | Bertness | 324/426 |
| 6,167,349 A | 12/2000 | Alvarez | 702/63 |
| 6,172,483 B1 | 1/2001 | Champlin | 320/134 |
| 6,172,505 B1 | 1/2001 | Bertness | 324/430 |
| 6,181,545 B1 | 1/2001 | Amatucci et al. | 361/502 |
| 6,222,369 B1 | 4/2001 | Champlin | 324/430 |
| 6,225,808 B1 | 5/2001 | Varghese et al. | 324/426 |
| 6,236,332 B1 | 5/2001 | Conkright et al. | 340/825.06 |
| 6,242,891 B1 * | 6/2001 | Parsonage | 320/132 |
| 6,249,124 B1 | 6/2001 | Bertness | 324/426 |
| 6,250,973 B1 | 6/2001 | Lowery et al. | 439/763 |
| 6,254,438 B1 | 7/2001 | Gaunt | 439/755 |
| 6,259,254 B1 | 7/2001 | Klang | 324/427 |
| 6,262,563 B1 | 7/2001 | Champlin | 320/134 |
| 6,294,896 B1 | 9/2001 | Champlin | 320/134 |
| 6,294,897 B1 | 9/2001 | Champlin | 320/153 |
| 6,304,087 B1 | 10/2001 | Bertness | 324/426 |
| 6,307,349 B1 | 10/2001 | Koenck et al. | 320/112 |
| 6,310,481 B2 | 10/2001 | Bertness | 324/430 |
| 6,313,607 B1 | 11/2001 | Champlin | 320/132 |
| 6,313,608 B1 | 11/2001 | Varghese et al. | 32/132 |
| 6,316,914 B1 | 11/2001 | Bertness | 320/134 |
| 6,323,650 B1 | 11/2001 | Bertness et al. | 324/426 |
| 6,329,793 B1 | 12/2001 | Bertness et al. | 320/132 |
| 6,331,762 B1 | 12/2001 | Bertness | 320/134 |
| 6,332,113 B1 | 12/2001 | Bertness | 702/63 |
| 6,346,795 B2 | 2/2002 | Haraguchi et al. | 320/136 |
| 6,347,958 B1 | 2/2002 | Tsai | 439/488 |
| 6,351,102 B1 | 2/2002 | Troy | 320/139 |
| 6,359,441 B1 | 3/2002 | Bertness | 324/426 |
| 6,359,442 B1 | 3/2002 | Henningson et al. | 324/426 |
| 6,363,303 B1 * | 3/2002 | Bertness | 701/29 |
| 6,384,608 B1 | 5/2002 | Namaky | 324/425 |
| 6,388,448 B1 | 5/2002 | Cervas | 324/426 |
| 6,392,414 B2 | 5/2002 | Bertness | 324/429 |
| 6,411,098 B1 | 6/2002 | Laletin | 324/436 |
| 6,417,669 B1 | 7/2002 | Champlin | 324/426 |
| 6,424,158 B2 | 7/2002 | Klang | 324/433 |
| 6,441,585 B1 | 8/2002 | Bertness | 320/132 |
| 6,445,158 B1 | 9/2002 | Bertness et al. | 320/104 |
| 6,456,045 B1 | 9/2002 | Troy et al. | 320/139 |
| 6,466,025 B1 | 10/2002 | Klang | 324/429 |
| 6,466,026 B1 | 10/2002 | Champlin | 324/430 |
| 6,483,275 B1 * | 11/2002 | Nebrigic et al. | 320/135 |
| 6,495,990 B2 | 12/2002 | Champlin | 320/132 |
| 6,570,503 B1 * | 5/2003 | Ulert et al. | 340/573.1 |

| | | |
|---|---|---|
| 6,633,165 B2 * 10/2003 | Bertness | 324/426 |

FOREIGN PATENT DOCUMENTS

| | | |
|---|---|---|
| FR | 2 749 397 | 12/1997 |
| GB | 2 088 159 A | 6/1982 |
| JP | 59-17892 | 1/1984 |
| JP | 59-17893 | 1/1984 |
| JP | 59-17894 | 1/1984 |
| JP | 59017894 | 1/1984 |
| JP | 59215674 | 12/1984 |
| JP | 60225078 | 11/1985 |
| JP | 62-180284 | 8/1987 |
| JP | 63027776 | 2/1988 |
| JP | 03274479 | 12/1991 |
| JP | 03282276 | 12/1991 |
| JP | 4-8636 | 1/1992 |
| JP | 04131779 | 5/1992 |
| JP | 04372536 | 12/1992 |
| JP | 5216550 | 8/1993 |
| JP | 7-128414 | 5/1995 |
| JP | 09061505 | 3/1997 |
| JP | 10056744 | 2/1998 |
| RU | 2089015 C1 | 8/1997 |
| WO | WO 93/22666 | 11/1993 |
| WO | WO 94/05069 | 3/1994 |
| WO | WO 98/58270 | 12/1998 |
| WO | WO 99/23738 | 5/1999 |

OTHER PUBLICATIONS

Internal Resistance: Harbinger of Capacity Loss in Starved Electrolyte Sealed Lead Acid Batteries, by Vaccaro, F.J. et al., *AT&T Bell Laboratories,* 1987 IEEE, Ch. 2477, pp. 128, 131.

IEEE Recommended Practice For Maintenance, Testings, and Replacement of Large Lead Storage Batteries for Generating Stations and Substations, *The Institute of Electrical and Electronics Engineers, Inc., ANSI/IEEE Std.* 450–1987, Mar. 9, 1987, pp. 7–15.

"Field and Laboratory Studies to Assess the State of Health of Valve–Regulated Lead Acid Batteries: Part I Conductance/Capacity Correlation Studies", by D. Feder et al., *IEEE,* Aug. 1992, pp. 218–233.

"Battery Impedance", by E. Willihnganz et al., *Electrical Engineering,* Sep. 1959, pp. 922–925.

"JIS Japanese Industrial Standard–Lead Acid Batteries for Automobiles", *Japanese Standards Association UDC,* 621.355.2:629.113.006, Nov. 1995.

"Performance of Dry Cells", by C. Hambuechen, Preprint of *Am. Electrochem. Soc.,* Apr. 18–20, 1912, paper No. 19, pp. 1–5.

"A Bridge for Measuring Storage Battery Resistance", by E. Willihncanz, *The Electrochemical Society,* preprint 79–20, Apr. 1941, pp. 253–258.

National Semiconductor Corporation, "High Q Notch Filter", Mar. 1969, Linear Brief 5.

Burr–Brown Corporation, "Design A 60 Hz Notch Filter with the UAF42", Jan. 1994, AB–071.

National Semiconductor Corporation, "LMF90–$4^{th}$–Order Elliptic Notch Filter", Dec. 1994, RRD–B30M115.

"Alligator Clips with Wire Penetrators"*J.S. Popper, Inc.* product information, downloaded from http://www.jspopper.com/, undated.

"#12: LM78S40 Simple Switcher DC to DC Converter", *ITM e–Catalog,* downloaded from http://www.pcbcafe.com, undated.

"Simple DC–DC Converts Allows Use of Single Battery", *Electronix Express,* downloaded from http://www.elexp.com/t_dc–dc.htm, undated.

"DC–DC Converter Basics", *Power Designers,* downloaded from http://www.powederdesigners.com/InforWeb.design_center/articles/DC–DC/converter.shtm, undated.

"Notification of Transmittal of The International Search Report or the Declaration", PCT/US02/29461.

* cited by examiner

APPARATUS AND METHOD FOR PROTECTING A BATTERY FROM OVERDISCHARGE

BACKGROUND OF THE INVENTION

The present invention relates to storage batteries. More specifically, the present invention relates to protecting storage batteries from overdischarge.

Storage batteries, such as lead acid storage batteries of the type used in electrically propelled traction vehicles (such as forklift trucks and electric cars), have existed for many years. Such storage batteries consist of a plurality of individual storage cells electrically connected in series. By connecting the cells in series, the voltages of the individual cells are added in a cumulative manner to provide a total voltage that is sufficient to energize such vehicles.

In order to maintain long life and peak performance of such storage batteries, there are a few general preventative measures to be taken. One such measure is preventing the battery for being discharged below its working level. This not only protects the battery but also the major current carrying components of the vehicle in which the battery is employed.

Prevention of destructive deep discharging of the battery is typically carried out by a battery controller. Battery controllers are available in a variety of shapes, sizes and features. They are commonly referred to as battery discharge indicators, battery protection indicators, battery discharge alarms or simply battery gauges. All units provide some form of warning or visual indication to allow the vehicle operator to monitor battery charge status. In general, a low-charge warning or alarm is provided to the operator substantially immediately after the battery terminal voltage falls below a predetermined threshold. However, battery terminal voltage may be affected, for short periods of time, by parameters other than the battery's actual state of charge, such as by discharge current. Thus, low-charge warnings provided substantially immediately after the battery terminal voltage drops below the predetermined threshold may be inaccurate. A battery overdischarge protection scheme which addresses one or more of these or other problems not described would be an improvement in the art.

SUMMARY OF THE INVENTION

A battery discharge indicator for protecting a storage battery is provided. The battery discharge indicator includes a positive connector that can couple to a positive terminal of the battery and a negative connector that can couple to a negative terminal of the battery. Also included, is a voltage sensor that couples to the battery via the positive connector and the negative connector and senses a battery terminal voltage. A microprocessor, coupled to the voltage sensor, provides a first alarm signal if a magnitude of the battery terminal voltage is below a first threshold for a first interval of time and if the magnitude of the battery terminal voltage is below a second threshold for a second interval of time.

BRIEF DESCRIPTION OF THE DRAWINGS

FIG. 1-2 shows the battery discharge indicator of FIG. 1-1 with a voltage controller included.

FIG. 2 is a simplified block diagram showing a system for protecting a battery in a vehicle in accordance with another embodiment of the present invention.

DETAILED DESCRIPTION OF THE PREFERRED EMBODIMENTS

Figure 1:
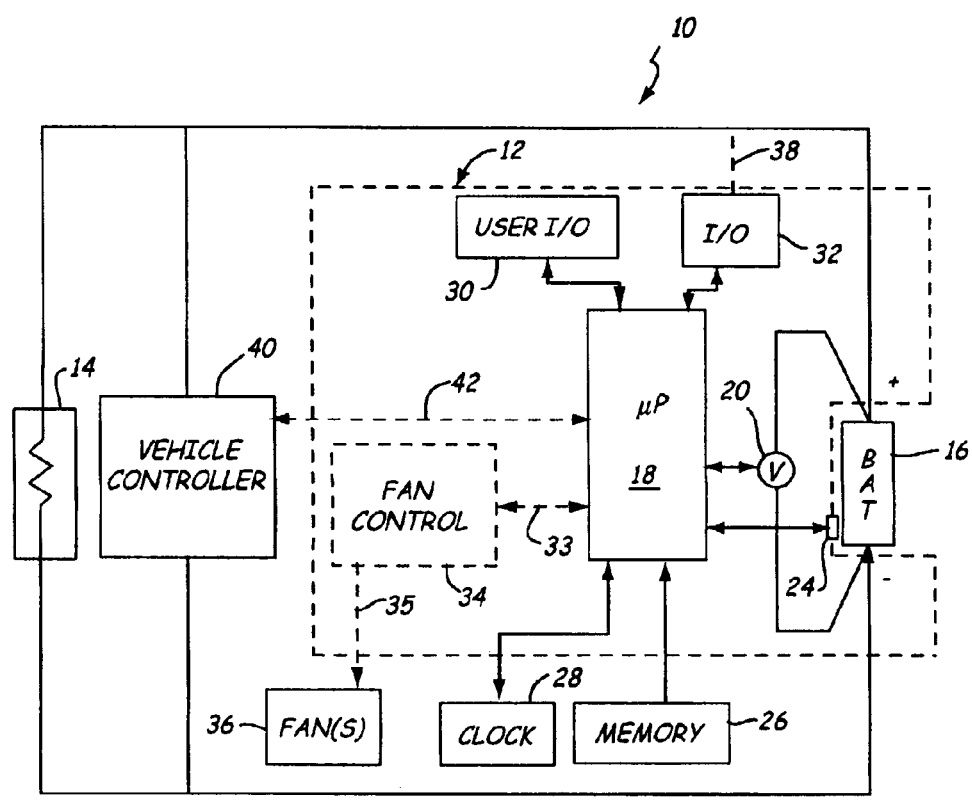
FIG. 1-1 is a simplified block diagram showing a system for protecting a battery in a vehicle in accordance with one embodiment of the present invention.

FIG. 1-1 is a simplified block diagram showing a vehicle 10 which includes a battery discharge indicator 12 in accordance with an embodiment of the present invention. Vehicle 10 includes vehicle loads 14 which are shown schematically as an electrical resistance. A battery 16 is coupled to the vehicle loads 14 and to battery discharge indicator 12. Battery 16 provides power to loads 14 during operation of vehicle 10. As can be seen in FIG. 1-1, discharge indicator 12 includes a microprocessor 18, a voltage sensor 20, a temperature sensor 24 and a memory 26. Voltage sensor 20, temperature sensor 24 and memory 26 are coupled to microprocessor 18. Also included in discharge indicator 12, and coupled to microprocessor 18, are system clock 28 and one or more inputs and/or outputs such as user input/output (I/O) 30 and I/O 32.

In embodiments of the present invention, battery discharge indicator 12 monitors a terminal voltage of battery 10 and provides one or more alarm signals that warn an operator of vehicle 10 if battery 16 is approaching a discharged condition. The alarm signals are provided when one or more predetermined conditions are fulfilled. For example, a first alarm signal can be provided if a magnitude of the battery terminal voltage is below a first threshold for a first interval of time and if the magnitude of the battery terminal voltage is below a second threshold for a second interval of time. By providing the first alarm signal as a function of both battery voltage level and time, premature or false alarms can be prevented. Threshold voltage levels, such as the first and second threshold levels, and corresponding predetermined time intervals, such as the first and second time intervals, are stored in memory 26. Microprocessor 18 monitors the terminal voltage of battery 16 based on battery voltage measurements that it receives from voltage sensor 20. Microprocessor 18 compares the battery terminal voltage readings with the threshold voltage values stored in memory 26 and, with the help of system clock 28 and the time interval values stored in memory 26, provides the first alarm signal to the vehicle operator through user I/O 30 if the predetermined conditions are met. First and second counters may be implemented in microprocessor 18 to track the first and second voltage levels over the first and second time intervals, respectively.

User I/O 30 can include a visual alarm and/or an audio alarm. The visual alarm may be a simple device such as a lamp, mounted on the dashboard of vehicle 10, which either begins to flash or comes on steady when microprocessor 18 determines that the magnitude of the battery terminal voltage is below the first threshold for the first time interval and/or microprocessor 18 determines that the magnitude of the battery terminal voltage is below the second threshold for the second interval of time. Similarly, the audio alarm can either provide intermittent sounds or a continuous sound when microprocessor 18 determines that the magnitude of the battery terminal voltage is below the first threshold for the first time interval and/or microprocessor 18 determines that the battery voltage is below the second threshold for the second interval of time. Further, in some embodiments of the present invention, user I/O 30 can include a selectable alarm feature having multiple selections including, but not limited to, different types of alarm sounds, different frequencies at which the intermittent alarm sounds can be provided, etc. In some embodiments of the present invention user I/O 30 includes a liquid crystal display that can provide the user with information related to the condition of the battery, etc.

In embodiments of the present invention, microprocessor 18 receives battery temperature readings from temperature sensor 24 and provides a second alarm signal to the vehicle operator, via user I/O 30, if the battery temperature is above a predetermined threshold. The battery temperature readings may relate to the ambient temperature in close proximity to the battery, the external temperature of the battery or the internal temperature of the battery.

Sensor 24 may be any suitable temperature sensor. In some embodiments, a non-contact temperature sensor, which can rapidly determine the temperature of battery 16 without making physical contact with battery 16, is employed. A non-contact infrared (IR) thermoplie reacts quickly to temperature changes and provides accurate readings, and is therefore suitable for use in the present invention. In other embodiments, a contact-type temperature sensor such as a thermocouple, a resistance temperature detector (RTD) sensor, an integrated circuit (IC) temperature sensor, a thermistor, etc., may be employed.

Typically, the first alarm signal, which is related to battery terminal voltage, is a different visual and/or audio alarm signal from the second alarm signal, which is related to battery temperature. Therefore, if the first alarm signal is a steady or continuous audio and/or visual alarm signal, the second alarm signal may be an intermittent audio and/or visual signal, for example.

In some embodiments of the present invention, battery discharge indicator 12 includes fan control 34 which can either be separate circuitry, coupled to microprocessor 18 via control line 33, or functionally implemented within microprocessor 18 based on instructions stored in memory 26. Fan(s) 36 can be automatically engaged by fan control 34, by sending control signals via control line 35, when battery 16 is re-charged. Microprocessor 18 determines that battery 16 is re-charged when an elevated voltage level across battery 10 is read by voltage sensor 20 and provided to microprocessor 18. In some embodiments, battery temperature readings, provided to microprocessor 18 by temperature sensor 24, are utilized by fan control 34 to engage fan(s) 36 when the battery temperature rises.

In some embodiments of the present invention, microprocessor 18 of battery discharge indicator 12 is configured or programmed to track battery usage information such as charge/discharge cycles, depth of discharge, ampere-hour usage, etc., of battery 16. This information is stored in memory 26 and used for warranty or billing purposes, for example. All this information can be recovered via vehicle bus 38 which is coupled to I/O 32. Bus 38 may be a Controller Area Network (CAN) bus, a Local Interconnect Network (LIN) bus, RS 232/422 bus, etc. The usage information can also be provided via a wireless communication link. In some embodiments, the battery usage information can be recovered using an IR light emitting diode (LED) emitter which can dump data related to battery usage upon request. The request for this information can be entered through User I/O 32. In some embodiments, battery discharge indicator 12 may be configured to provide battery usage information upon power-up of vehicle 10.

In some embodiments of the present invention, battery discharge indicator 12 is coupled to vehicle controller 40 via control line 42. In such embodiments, microprocessor 18 is configured to provide work function control signals, via control line 42, to vehicle controller 40, that direct controller 40 to disable/enable certain work functions of vehicle 10 based on the terminal voltage of battery 10. For example, if the battery terminal voltage is below the second threshold for the second interval of time, in addition to discharge indicator 12 providing the first alarm signal, microprocessor 18 can also direct controller 40 to disable a particular work function of vehicle 10. Thus, if vehicle 10 is a forklift, microprocessor 18 can direct controller 40 to disable the lift function, for example, if the above predetermined conditions are met. This helps to ensure that vehicle 10 is returned to the charging station before battery 16 has been completely discharged. Further, this also helps ensure that vehicle 10 does not abruptly stop operating while carrying out a particular work function.

In some embodiments of the present invention, in addition to the alarm signals being provided based on battery terminal voltage levels, time and battery temperature, discharge indicator 12 also takes into consideration the particular work function being carried out by vehicle 10 as a condition for providing alarm signals. In operation, information related to the work function currently being carried out by vehicle 10 is received by microprocessor 18 via control line 42. Since functions such as lift control, transmission, etc., each require different amounts of energy, microprocessor 18 suitably adjusts the nature, duration, etc., of the alarm signals based on work function related information received from controller 40 via control line 42. For example, if vehicle 10 is a forklift operating in drive mode, the alarm signal may be delayed since a relatively reduced amount of energy is required to operate the forklift in drive mode. However, if the forklift is operating in lift mode, the alarm signals are advanced due to the relatively high amount of energy required to carry out this function.

Figures 1, 2:
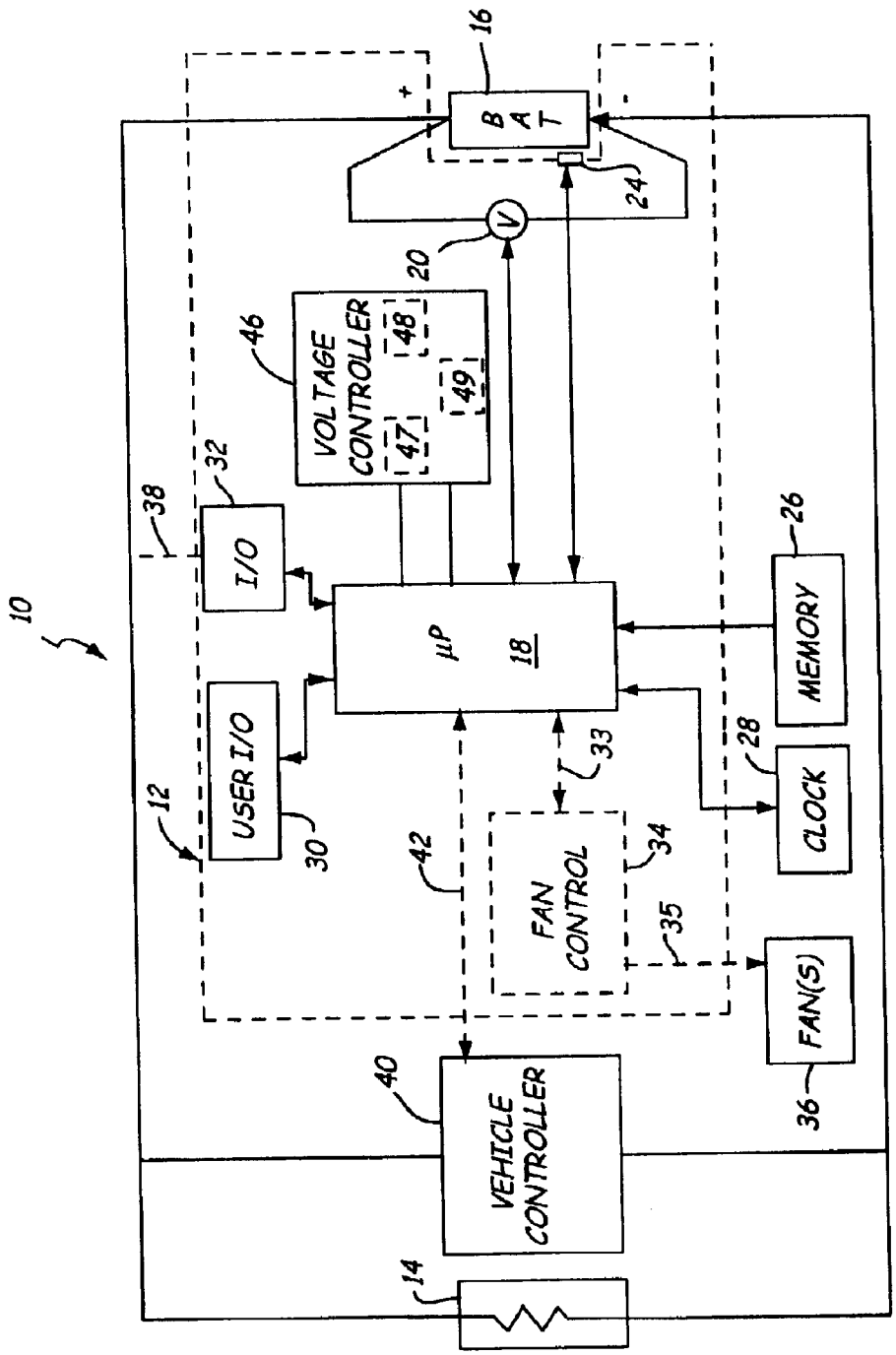
Figure 2:
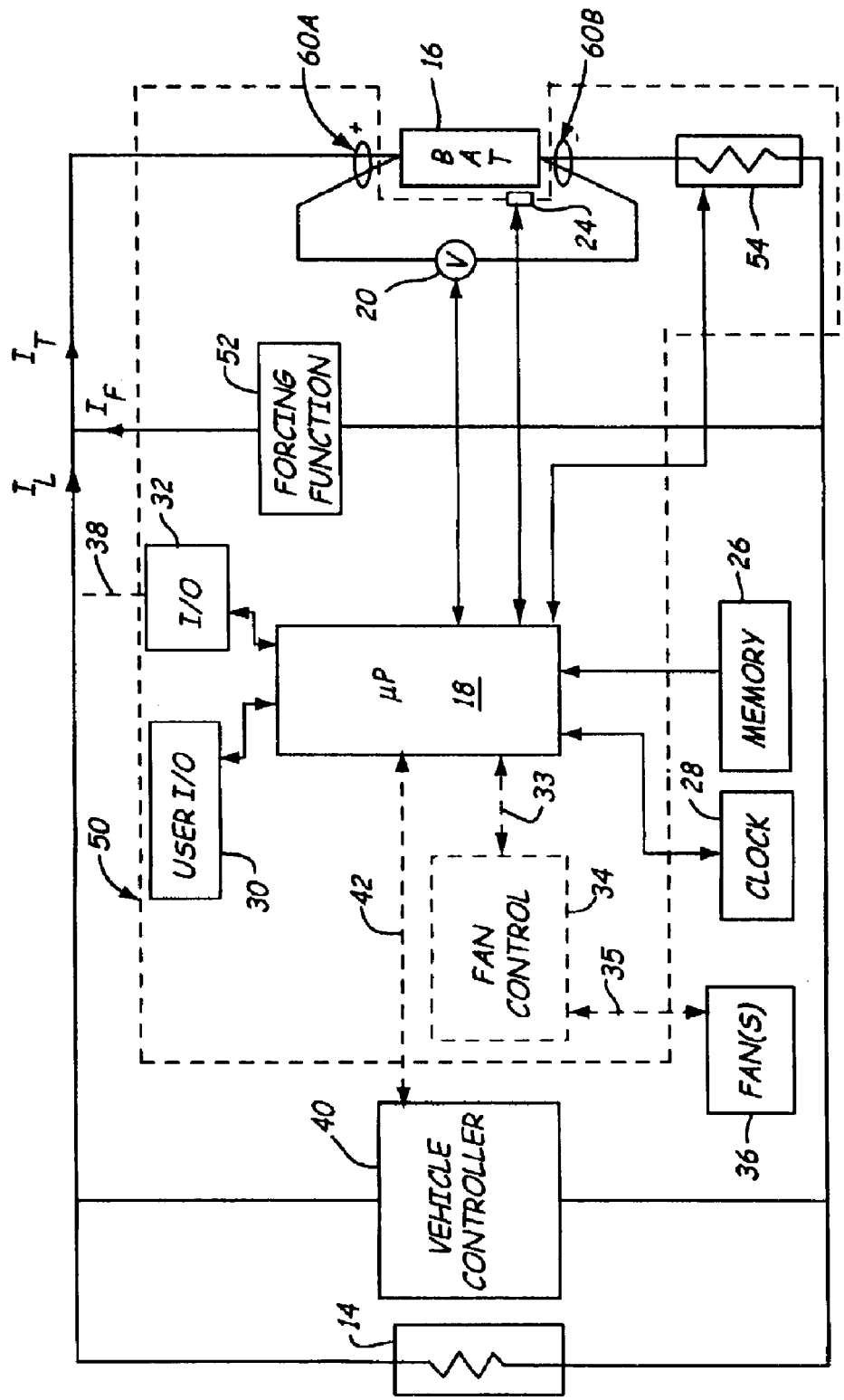

As mentioned above, battery 16 typically includes a plurality of individual storage cells electrically connected in series. Different types of vehicles 10 may require different types of batteries, each type having a different number of a series connected cells and therefore different terminal voltages. In general, prior art battery discharge indicators are designed to operate at only one voltage. Thus, a prior art battery discharge indicator suitable for one type of vehicle 10 employing, for example, a 12 volt battery is not suitable for use in a different type of vehicle 10 that requires, for example, a 48 volt battery. One aspect of the present invention includes the recognition of the aforementioned problem associated with prior art battery discharge indicators for use in vehicle 10. Therefore, in embodiments of the present invention, the threshold voltage values for detecting battery overdischarge are selected on a "volts/cell" basis during manufacture of discharge indicator 12 and subsequently multiplied by the number of cells included in battery 16 for a particular type of vehicle 10. Battery discharge indicator 12, upon installation in vehicle 10, automatically determines the number of cells contained in battery 16 and suitably adjusts the threshold voltage values. Specifically, voltage sensor 20 measures the voltage across terminals of battery 16 and provides the measured terminal voltage values to microprocessor 18, which determines the number of cells in battery 16 based on the measured terminal voltage value and accordingly adjusts the threshold voltage levels by multiplication as mentioned above. Further, as illustrated in FIG. 1-2, battery discharge indicator 12 of the present invention receives power from battery 16 via voltage controller 46, which provides a fixed supply voltage to battery discharge indicator 12 regardless of the voltage level it receives at its input from battery 16. Thus, whether battery 16 provides a terminal voltage of 12 volts, 16 volts, 48 volts, etc., voltage controller 46 will provide a fixed supply voltage to battery discharge indicator 12. Thus, battery discharge indicator 12 of the present invention does not need to be modified in any manner when utilized in different models of vehicle 10.

In general, voltage controller 46 can include one or more suitably electrically coupled devices such as linear regulator(s) 47, switching regulator(s) 48, DC-DC converter(s) 49, etc. Linear regulator 47 may include one or more discrete or variable resistors and a transistor, and switching regulator 48 may include components such as indicators, diodes and switches. One type of DC-DC converter suitable for use with the present invention is described in U.S. patent application Ser. No. 10/109,734, filed Mar. 28, 2002 and entitled "APPARATUS AND METHOD FOR COUNTERACTING SELF DISCHARGE IN A STORAGE BATTERY," which is incorporated herein by reference.

FIG. 2 is a simplified block diagram showing a battery discharge indicator 50 employed in vehicle 10 in accordance with another embodiment of the present invention. The same reference numerals are used to represent the same or similar elements of battery discharge indicator 12 (FIG. 1-1) and 50 (FIG. 2). Other than the inclusion of forcing function 52 and current sensor 54 in discharge indicator 50 (FIG. 2), the remaining elements of FIG. 2 are similar to the elements of FIG. 1-1. With these elements, in addition to being able to carry out the functions described above in connection with FIG. 1-1, battery discharge indicator 50 can also carry out tests to determine the condition of battery 16. Battery discharge indicator 50 is coupled to battery 16 through four-point or Kelvin connections 60A and 60B. One of the electrical connections on each side of battery 16 carry current while the other two connections are used to obtain voltage readings. Details regarding the testing of battery 16 using discharge indicator 50 are provided below.

In operation, microprocessor 18 is capable of measuring a dynamic parameter of battery 16. As used herein, a dynamic parameter includes any parameter of battery 16 which is measured as a function of a signal having an AC or transient component. Examples of dynamic parameters include dynamic resistance, conductance, admittance, impedance or their combinations. In various aspects of the invention, this measurement can be correlated, either alone or in combination with other measurements or inputs received by microprocessor 18, to the condition or status of battery 16. This correlation can be through testing of various batteries and may be through the use of a lookup table or a functional relationship such as a characterization curve. The relationship can also be adjusted based upon battery construction, type, size or other parameters of battery 16. Examples of various testing techniques are described in the following references which are incorporated herein by reference. U.S. Pat. No. 3,873,911, issued Mar. 25, 1975, to Champlin, entitled ELECTRONIC BATTERY TESTING DEVICE; U.S. Pat. No. 3,909,708, issued Sep. 30, 1975, to Champlin, entitled ELECTRONIC BATTERY TESTING DEVICE; U.S. Pat. No. 4,816,768, issued Mar. 28, 1989, to Champlin, entitled ELECTRONIC BATTERY TESTING DEVICE; U.S. Pat. No. 4,825,170, issued Apr. 25, 1989, to Champlin, entitled ELECTRONIC BATTERY TESTING DEVICE WITH AUTOMATIC VOLTAGE SCALING; U.S. Pat. No. 4,881,038, issued Nov. 14, 1989, to Champlin, entitled ELECTRONIC BATTERY TESTING DEVICE WITH AUTOMATIC VOLTAGE SCALING TO DETERMINE DYNAMIC CONDUCTANCE; U.S. Pat. No. 4,912,416, issued Mar. 27, 1990, to Champlin, entitled ELECTRONIC BATTERY TESTING DEVICE WITH STATE-OF-CHARGE COMPENSATION; U.S. Pat. No. 5,140,269, issued Aug. 18, 1992, to Champlin, entitled ELECTRONIC TESTER FOR ASSESSING BATTERY/CELL CAPACITY; U.S. Pat. No. 5,343,380, issued Aug. 30, 1994, entitled METHOD AND APPARATUS FOR SUPPRESSING TIME VARYING SIGNALS IN BATTERIES UNDERGOING CHARGING OR DISCHARGING; U.S. Pat. No. 5,572,136, issued Nov. 5, 1996, entitled ELECTRONIC BATTERY TESTER WITH AUTOMATIC COMPENSATION FOR LOW STATE-OF-CHARGE; U.S. Pat. No. 5,574,355, issued Nov. 12, 1996, entitled METHOD AND APPARATUS FOR DETECTION AND CONTROL OF THERMAL RUNAWAY IN A BATTERY UNDER CHARGE; U.S. Pat. No. 5,585,416, issued Dec. 10, 1996, entitled APPARATUS AND METHOD FOR STEP-CHARGING BATTERIES TO OPTIMIZE CHARGE ACCEPTANCE; U.S. Pat. No. 5,585,728, issued Dec. 17, 1996, entitled ELECTRONIC BATTERY TESTER WITH AUTOMATIC COMPENSATION FOR LOW STATE-OF-CHARGE; U.S. Pat. No. 5,589,757, issued Dec. 31, 1996, entitled APPARATUS AND METHOD FOR STEP-CHARGING BATTERIES TO OPTIMIZE CHARGE ACCEPTANCE; U.S. Pat. No. 5,592,093, issued Jan. 7, 1997, entitled ELECTRONIC BATTERY TESTING DEVICE LOOSE TERMINAL CONNECTION DETECTION VIA A COMPARISON CIRCUIT; U.S. Pat. No. 5,598,098, issued Jan. 28, 1997, entitled ELECTRONIC BATTERY TESTER WITH VERY HIGH NOISE IMMUNITY; U.S. Pat. No. 5,656,920, issued Aug. 12, 1997, entitled METHOD FOR OPTIMIZING THE CHARGING LEAD-ACID BATTERIES AND AN INTERACTIVE CHARGER; U.S. Pat. No. 5,757,192, issued May 26, 1998, entitled METHOD AND APPARATUS FOR DETECTING A BAD CELL IN A STORAGE BATTERY; U.S. Pat. No. 5,821,756, issued Oct. 13, 1998, entitled ELECTRONIC BATTERY TESTER WITH TAILORED COMPENSATION FOR LOW STATE-OF-CHARGE; U.S. Pat. No. 5,831,435, issued Nov. 3, 1998, entitled BATTERY TESTER FOR JIS STANDARD; U.S. Pat. No. 5,914,605, issued Jun. 22, 1999, entitled ELECTRONIC BATTERY TESTER; U.S. Pat. No. 5,945,829, issued Aug. 31, 1999, entitled MIDPOINT BATTERY MONITORING; U.S. Pat. No. 6,002,238, issued Dec. 14, 1999, entitled METHOD AND APPARATUS FOR MEASURING COMPLEX IMPEDANCE OF CELLS AND BATTERIES; U.S. Pat. No. 6,037,751, issued Mar. 14, 2000, entitled APPARATUS FOR CHARGING BATTERIES; U.S. Pat. No. 6,037,777, issued Mar. 14, 2000, entitled METHOD AND APPARATUS FOR DETERMINING BATTERY PROPERTIES FROM COMPLEX IMPEDANCE/ADMITTANCE; U.S. Pat. No. 6,051,976, issued Apr. 18, 2000, entitled METHOD AND APPARATUS FOR AUDITING A BATTERY TEST; U.S. Pat. No. 6,081,098, issued. Jun. 27, 2000, entitled METHOD AND APPARATUS FOR CHARGING A BATTERY; U.S. Pat. No. 6,091,245, issued Jul. 18, 2000, entitled METHOD AND APPARATUS FOR AUDITING A BATTERY TEST; U.S. Pat. No. 6,104,167, issued Aug. 15, 2000, entitled METHOD AND APPARATUS FOR CHARGING A BATTERY; U.S. Pat. No. 6,137,269, issued Oct. 24, 2000, entitled METHOD AND APPARATUS FOR ELECTRONICALLY EVALUATING THE INTERNAL TEMPERATURE OF AN ELECTROCHEMICAL CELL OR BATTERY; U.S. Pat. No. 6,163,156, issued Dec. 19, 2000, entitled ELECTRICAL CONNECTION FOR ELECTRONIC BATTERY TESTER; U.S. Pat. No. 6,172,483, issued Jan. 9, 2001, entitled METHOD AND APPARATUS FOR MEASURING COMPLEX IMPEDANCE OF CELL AND BATTERIES; U.S. Pat. No. 6,172,505, issued Jan. 9, 2001, entitled ELECTRONIC BATTERY TESTER; U.S. Pat. No. 6,222,369, issued Apr. 24, 2001, entitled METHOD AND APPARATUS FOR DETERMINING BATTERY PROPERTIES FROM COMPLEX IMPEDANCE/ ADMITTANCE; U.S. Pat. No. 6,225,808, issued May 1, 2001, entitled TEST COUNTER FOR ELECTRONIC BATTERY TESTER; U.S. Pat. No. 6,249,124, issued Jun. 19, 2001, entitled ELECTRONIC BATTERY TESTER WITH INTERNAL BATTERY; U.S. Pat. No. 6,259,254, issued Jul. 10, 2001, entitled APPARATUS AND METHOD FOR CARRYING OUT DIAGNOSTIC TESTS ON BATTERIES AND FOR RAPIDLY CHARGING BATTERIES; U.S. Pat. No. 6,262,563, issued Jul. 17, 2001, entitled METHOD AND APPARATUS FOR MEASURING COMPLEX ADMITTANCE OF CELLS AND BATTERIES; U.S. Pat. No. 6,294,896, issued Sep. 25, 2001; entitled METHOD AND APPARATUS FOR MEASURING COMPLEX SELF-IMMITANCE OF A GENERAL ELECTRICAL ELEMENT; U.S. Pat. No. 6,294,897, issued Sep. 25, 2001, entitled METHOD AND APPARATUS FOR ELECTRONICALLY EVALUATING THE INTERNAL TEMPERATURE OF AN ELECTROCHEMICAL CELL OR BATTERY; U.S. Pat. No. 6,304,087, issued Oct. 16, 2001, entitled APPARATUS FOR CALIBRATING ELECTRONIC BATTERY TESTER; U.S. Pat. No. 6,310,481, issued Oct. 30, 2001, entitled ELECTRONIC BATTERY TESTER; U.S. Pat. No. 6,313,607, issued Nov. 6, 2001, entitled METHOD AND APPARATUS FOR EVALUATING STORED CHARGE IN AN ELECTROCHEMICAL CELL OR BATTERY; U.S. Pat. No. 6,313,608, issued Nov. 6, 2001, entitled METHOD AND APPARATUS FOR CHARGING A BATTERY; U.S. Pat. No. 6,316,914, issued Nov. 13, 2001, entitled TESTING PARALLEL STRINGS OF STORAGE BATTERIES; U.S. Pat. No. 6,323,650, issued Nov. 27, 2001, entitled ELECTRONIC BATTERY TESTER; U.S. Pat. No. 6,329,793, issued Dec. 11, 2001, entitled METHOD AND APPARATUS FOR CHARGING A BATTERY; U.S. Pat. No. 6,331,762, issued Dec. 18, 2001, entitled ENERGY MANAGEMENT SYSTEM FOR AUTOMOTIVE VEHICLE; U.S. Pat. No. 6,332,113, issued Dec. 18, 2001, entitled ELECTRONIC BATTERY TESTER; U.S. Pat. No. 6,351,102, issued Feb. 26, 2002, entitled AUTOMOTIVE BATTERY CHARGING SYSTEM TESTER; U.S. Pat. No. 6,359,441, issued Mar. 19, 2002, entitled ELECTRONIC BATTERY TESTER; U.S. Pat. No. 6,363,303, issued Mar. 26, 2002, entitled ALTERNATOR DIAGNOSTIC SYSTEM, U.S. Pat. No. 6,392,414, issued May 21, 2002, entitled ELECTRONIC BATTERY TESTER; U.S. Pat. No. 6,417,669, issued Jul. 9, 2002, entitled SUPPRESSING INTERFERENCE IN AC MEASUREMENTS OF CELLS, BATTERIES AND OTHER ELECTRICAL ELEMENTS; U.S. Pat. No. 6,424,158, issued Jul. 23, 2002, entitled APPARATUS AND METHOD FOR CARRYING OUT DIAGNOSTIC TESTS ON BATTERIES AND FOR RAPIDLY CHARGING BATTERIES; U.S. Pat. No. 6,441,585, issued Aug. 17, 2002, entitled APPARATUS AND METHOD FOR TESTING RECHARGEABLE ENERGY STORAGE BATTERIES; U.S. Pat. No. 6,445,158, issued Sep. 3, 2002, entitled VEHICLE ELECTRICAL SYSTEM TESTER WITH ENCODED OUTPUT; U.S. Pat. No. 6,456,045, issued Sep. 24, 2002, entitled INTEGRATED CONDUCTANCE AND LOAD TEST BASED ELECTRONIC BATTERY TESTER; U.S. Pat. No. 6,466,025, issued Oct. 15, 2002, entitled ALTERNATOR TESTER; U.S. Pat. No. 6,466,026, issued Oct. 15, 2002, entitled PROGRAMMABLE CURRENT EXCITER FOR MEASURING AC IMMITTANCE OF CELLS AND BATTERIES; U.S. Ser. No. 09/703,270, filed Oct. 31, 2000, entitled ELECTRONIC BATTERY TESTER; U.S. Ser. No. 09/780,146, filed Feb. 9, 2001, entitled STORAGE BATTERY WITH INTEGRAL BATTERY TESTER; U.S. Ser. No. 09/816,768, filed Mar. 23, 2001, entitled MODULAR BATTERY TESTER; U.S. Ser. No. 09/756,638, filed Jan. 8, 2001, entitled METHOD AND APPARATUS FOR DETERMINING BATTERY PROPERTIES FROM COMPLEX IMPEDANCE/ADMITTANCE; U.S., Ser. No. 09/862,783, filed May 21, 2001, entitled METHOD AND APPARATUS FOR TESTING CELLS AND BATTERIES EMBEDDED IN SERIES/PARALLEL SYSTEMS; U.S. Ser. No. 09/960,117, filed Sep. 20, 2001, entitled IN-VEHICLE BATTERY MONITOR; U.S. Ser. No. 09/908,389, filed Jul. 18, 2001, entitled BATTERY CLAMP WITH INTEGRATED CIRCUIT SENSOR; U.S. Ser. No. 09/908,278, filed Jul. 18, 2001, entitled BATTERY CLAMP WITH EMBEDDED ENVIRONMENT SENSOR; U.S. Ser. No. 09/880,473, filed Jun. 13, 2001; entitled BATTERY TEST MODULE; U.S. Ser. No. 09/940,684, filed Aug. 27, 2001, entitled METHOD AND APPARATUS FOR EVALUATING STORED CHARGE IN AN ELECTROCHEMICAL CELL OR BATTERY; U.S. Ser. No. 60/330,441, filed Oct. 17, 2001, entitled ELECTRONIC BATTERY TESTER WITH RELATIVE TEST OUTPUT; U.S. Ser. No. 60/348,479, filed Oct. 29, 2001, entitled CONCEPT FOR TESTING HIGH POWER VRLA BATTERIES; U.S. Ser. No. 10/046,659, filed Oct. 29, 2001, entitled ENERGY MANAGEMENT SYSTEM FOR AUTOMOTIVE VEHICLE; U.S. Ser. No. 09/993,468, filed Nov. 14, 2001, entitled KELVIN CONNECTOR FOR A BATTERY POST; U.S. Ser. No. 09/992,350, filed Nov. 26, 2001, entitled ELECTRONIC BATTERY TESTER, U.S. Ser. No. 60/341,902, filed Dec. 19, 2001, entitled BATTERY TESTER MODULE; U.S. Ser. No. 10/042,451, filed Jan. 8, 2002, entitled BATTERY CHARGE CONTROL DEVICE, U.S. Ser. No. 10/073,378, filed Feb. 8, 2002, entitled METHOD AND APPARATUS USING A CIRCUIT MODEL TO EVALUATE CELL/ BATTERY PARAMETERS; U.S. Ser. No. 10/093,853, filed Mar. 7, 2002, entitled ELECTRONIC BATTERY TESTER WITH NETWORK COMMUNICATION; U.S. Ser. No. 60/364,656, filed Mar. 14, 2002, entitled ELECTRONIC BATTERY TESTER WITH LOW TEMPERATURE RATING DETERMINATION; U.S. Ser. No. 10/098,741, filed Mar. 14, 2002, entitled METHOD AND APPARATUS FOR AUDITING A BATTERY TEST; U.S. Ser. No. 10/101,543, filed Mar. 19, 2002, entitled ELECTRONIC BATTERY TESTER; U.S. Ser. No. 10/112,114, filed Mar. 28, 2002; U.S. Ser. No. 10/109,734, filed Mar. 28, 2002; U.S. Ser. No. 10/112,105, filed Mar. 28, 2002, entitled CHARGE CONTROL SYSTEM FOR A VEHICLE BATTERY; U.S. Ser. No. 10/112,998, filed Mar. 29, 2002, entitled BATTERY TESTER WITH BATTERY REPLACEMENT OUTPUT; U.S. Ser. No. 10/119,297, filed Apr. 9, 2002, entitled METHOD AND APPARATUS FOR TESTING CELLS AND BATTERIES EMBEDDED IN SERIES/PARALLEL SYSTEMS; U.S. Ser. No. 10/128,790, filed Apr. 22, 2002, entitled METHOD OF DISTRIBUTING JUMP-START BOOSTER PACKS; U.S. Ser. No. 60/379,281, filed May 8, 2002, entitled METHOD FOR DETERMINING BATTERY STATE OF CHARGE; U.S. Ser. No. 10/143,307, filed May 10, 2002, entitled ELECTRONIC BATTERY TESTER; U.S. Ser. No. 60/387,046, filed Jun. 7, 2002, entitled METHOD AND APPARATUS FOR INCREASING THE LIFE OF A STORAGE BATTERY; U.S. Ser. No. 10/177,635, filed Jun. 21, 2002, entitled BATTERY CHARGER WITH BOOSTER PACK; U.S. Ser. No. 10/207,495, filed Jul. 29, 2002, entitled KELVIN CLAMP FOR ELECTRICALLY COUPLING TO A BATTERY CONTACT; U.S. Ser. No. 10/200,041, filed Jul. 19, 2002, entitled AUTOMOTIVE VEHICLE ELECTRICAL SYSTEM DIAGNOSTIC DEVICE; U.S. Ser. No. 10/217,913, filed Aug. 13, 2002, entitled, BATTERY TEST MODULE; U.S. Ser. No. 60/408,542, filed Sep. 5, 2002, entitled BATTERY TEST OUTPUTS ADJUSTED BASED UPON TEMPERATURE; U.S. Ser. No. 10/246,439, filed Sep. 18, 2002, entitled BATTERY TESTER UPGRADE USING SOFTWARE KEY; U.S. Ser. No. 60/415,399, filed Oct. 2, 2002, entitled QUERY BASED ELECTRONIC BATTERY TESTER; and U.S. Ser. No. 10/263,473, filed Oct. 2, 2002, entitled ELECTRONIC BATTERY TESTER WITH RELATIVE TEST OUTPUT; U.S. Ser. No. 60/415,796, filed Oct. 3, 2002, entitled QUERY BASED ELECTRONIC BATTERY TESTER; U.S. Ser. No. 10/271,342, filed Oct. 15, 2002, entitled IN-VEHICLE BATTERY MONITOR; U.S. Ser. No. 10/270,777, filed Oct. 15, 2002, entitled PROGRAMMABLE CURRENT EXCITER FOR MEASURING AC IMMITTANCE OF CELLS AND BATTERIES.

In the specific embodiment illustrated in FIG. 2, forcing function 52 is a function which applies a signal having an AC or transient component to battery 16. The forcing function can be through the application of a load which provides a desired forcing function in which current is drawn from battery 16, or can be through active circuitry in which a current is injected into battery 16. This results in a current labeled $I_F$ in FIG. 2. The total current, $I_T$ through battery 16 is due to both the forcing function current $I_F$ and the current flowing through loads 14, $I_L$. Current sensor 54 is positioned to sense the total current $I_T$. One example battery dynamic parameter, the dynamic conductance ($\Delta G$), can be calculated as:

$$\Delta G = \Delta I_T / \Delta V \quad \text{Equation 1}$$

where $\Delta V$ is the change in voltage measured across the battery 16 by voltage sensor 20 and $\Delta I_T$ is the change in total current measured flowing through battery 16 using current sensor 54. The forcing function 52 is provided in order to ensure that the current through battery 16 changes with time. However, in one embodiment, changes in $I_L$ due to loads 14 can be used alone such that $\Delta I_T = \Delta I_L$ and the forcing function 52 is not required. Measurements obtained from temperature sensor 24 may be utilized to compensate for battery condition measurements.

In one embodiment, current sensor 54 comprises a resistance shunt of 250 μohms and current through the shunt is determined by measuring the voltage drop across the shunt. However, other types of current measurement techniques can also be used such as Hall Effect sensors or through an inductance probe. The change of voltage across the battery and the resultant change in current through the battery is sampled using, for example, one or more analog to digital converters (not shown). This information can be correlated to determine the total capacity, such as the total Cold Cranking Amp (CCA) capacity of the battery.

In general, the present invention uses the direct relationship between the dynamic conductance of the battery and the condition of the battery. For example, if a battery drops more than 15% below its rated capacity, microprocessor 18 can provide an output which indicates that the battery 16 should be replaced. Further, the conductance can be used to determine the charge level of the battery. Particular examples for determining the state of charge of a battery utilizing conductance measurements are described and illustrated in U.S. Pat. No. 6,331,762, issued Dec. 18, 2001, and entitled ENERGY MANAGEMENT SYSTEM FOR AUTOMOTIVE VEHICLE which is incorporated herein by reference in its entirety. The charge level obtained using the above technique can be employed to provide more accurate alarm signals.

Figure 3:
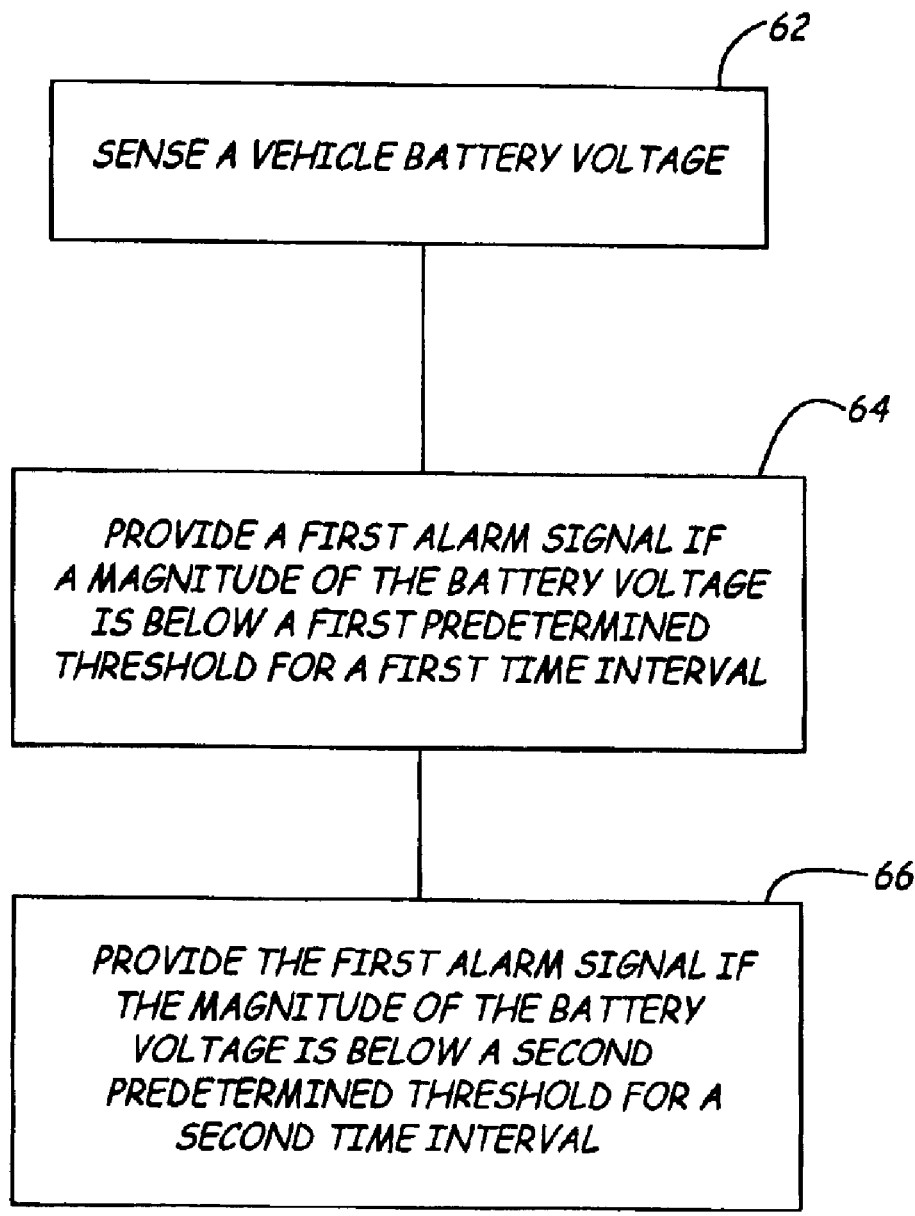
FIG. 3 is a flow chart of a system for protecting a battery in a vehicle in accordance with an embodiment of the present invention.

FIG. 3 is a flowchart representing a method of protecting a vehicle battery from overdischarge in accordance with an illustrative embodiment of the present invention. At step 62, a battery voltage is sensed. At step 64, a first alarm signal is provided if a magnitude of the battery voltage is below a first predetermined threshold. At step 66, the first alarm signal is provided if the magnitude of the battery voltage is below a second predetermined threshold for a second interval of time. Different techniques, some of which are set forth above, can be employed to carry out the steps shown in the flowchart of FIG. 3 while maintaining substantially the same functionality without departing from the scope and spirit of the present invention.

Although the present invention has been described with reference to preferred embodiments, workers skilled in the art will recognize that changes may be made in form and detail without departing from the spirit and scope of the invention. In general, battery discharge indicator 12, 50 of the present invention can be utilized with any vehicle that utilizes a battery for all or part of its operation. Further, any number of threshold voltage levels, time intervals, temperature measurements, etc., may be utilized to provide any number of suitable alarm signals without departing from the spirit and scope of the invention.

What is claimed is:

1. A battery discharge indicator, comprising:
   a positive connector configured to couple to a positive terminal of the battery;
   a negative connector configured to couple to a negative terminal of the battery;
   a voltage sensor configured to couple to the battery via the positive connector and the negative connector and to sense a battery terminal voltage; and
   a microprocessor, coupled to the voltage sensor, configured to provide, substantially independently of a load being applied to the battery, a first alarm signal if a magnitude of the battery terminal voltage is below a first threshold voltage level for a first time interval and if the magnitude of the battery terminal voltage is below a second threshold voltage level for a second time interval.

2. The apparatus of claim 1 further comprising a temperature sensor configured to measure a battery temperature and to provide the measured battery temperature to the microprocessor, which in turn provides a second alarm signal if the battery temperature is above a predetermined threshold.

3. The apparatus of claim 2 wherein the measured battery temperature is the ambient temperature in close proximity to the battery.

4. The apparatus of claim 2 wherein the measured battery temperature is the external temperature of the battery.

5. The apparatus of claim 2 wherein the measured battery temperature in the internal temperature of the battery.

6. The apparatus of claim 2 wherein the temperature sensor comprises a non-contact infrared thermoplie sensor.

7. The apparatus of claim 2 wherein the temperature sensor comprises a thermocouple.

8. The apparatus of claim 2 wherein the temperature sensor comprises a resistance temperature detector (RTD) sensor.

9. The apparatus of claim 2 wherein the temperature sensor comprises an integrated circuit (IC) sensor.

10. The apparatus of claim 2 wherein the temperature sensor comprises a thermistor.

11. The apparatus of claim 1 wherein the first alarm signal is output as a visual alarm signal.

12. The apparatus of claim 1 wherein the first alarm signal is output as an audio alarm signal.

13. The apparatus of claim 1 further comprising an input, coupled to the microprocessor, configured to receive a selected one of a plurality of alarm signals, which the microprocessor is configured to employ as the first alarm signal.

14. The apparatus of claim 1 further comprising a voltage controller configured to receive an input voltage from the battery and to provide a substantially constant supply voltage to the microprocessor.

15. The apparatus of claim 14 wherein the voltage controller comprises a linear regulator.

16. The apparatus of claim 14 wherein the voltage controller comprises a switching regulator.

17. The apparatus of claim 14 wherein the voltage controller comprises a DC-DC converter.

18. The apparatus of claim 1 wherein the first threshold, voltage level is determined by the microprocessor by multiplying a predetermined cell threshold voltage value corresponding to a single cell of the battery by a number of cells in the battery.

19. A method of protecting a vehicle battery from overdischarge, comprising:

(a) sensing a battery voltage;

(b) providing a first alarm signal if a magnitude of the battery voltage is below a first threshold voltage level for a first interval of time; and (c) providing the first alarm signal if the magnitude of the battery voltage is below a second threshold voltage level for a second interval of time, wherein steps (b) and (c) are carried out substantially independently of a load being applied to the battery.

20. The method of claim 19 further comprising measuring a battery temperature and providing a second alarm signal if the measured battery temperature is above a predetermined threshold.

* * * * *

UNITED STATES PATENT AND TRADEMARK OFFICE
CERTIFICATE OF CORRECTION

PATENT NO. : 6,888,468 B2
DATED : May 3, 2005
INVENTOR(S) : Bertness

It is certified that error appears in the above-identified patent and that said Letters Patent is hereby corrected as shown below:

Title page,
Item [56], References Cited, FOREIGN PATENT DOCUMENTS, add
-- WO        WO 00/67359        11/9/00
   WO        WO 01/51947        7/19/01 --.

Column 11,
Line 22, after "threshold" delete ",".

Signed and Sealed this

First Day of November, 2005

JON W. DUDAS
*Director of the United States Patent and Trademark Office*